(12) United States Patent
Babitchenko et al.

(10) Patent No.: US 11,624,601 B1
(45) Date of Patent: Apr. 11, 2023

(54) CALIPER AND ACCESSORIES THEREFOR

(71) Applicants: Eugene Babitchenko, Granada Hills, CA (US); Rafail Babitchenko, Granada Hills, CA (US)

(72) Inventors: Eugene Babitchenko, Granada Hills, CA (US); Rafail Babitchenko, Granada Hills, CA (US)

( * ) Notice: Subject to any disclaimer, the term of this patent is extended or adjusted under 35 U.S.C. 154(b) by 0 days.

(21) Appl. No.: 18/088,557

(22) Filed: Dec. 24, 2022

(51) Int. Cl.
  *G01B 3/18* (2006.01)
(52) U.S. Cl.
  CPC .................................. *G01B 3/18* (2013.01)
(58) Field of Classification Search
  CPC ........................................................ G01B 3/18
  See application file for complete search history.

(56) References Cited

U.S. PATENT DOCUMENTS

| | | | |
|---|---|---|---|
| 6,766,583 B2 * | 7/2004 | Economaki | G01B 3/56 33/534 |
| 7,475,493 B2 * | 1/2009 | Haglof | G01B 3/20 33/783 |
| 9,347,760 B2 * | 5/2016 | Thorley | G01B 5/0028 |
| 2008/0189971 A1 * | 8/2008 | Wo | G01B 5/08 33/784 |

* cited by examiner

*Primary Examiner* — Yaritza Guadalupe-McCall
(74) *Attorney, Agent, or Firm* — Aleksandr Smushkovich

(57) ABSTRACT

A tool for measurement of a body is proposed. It includes a caliper furnished with a slider, a fixed finger, a moving finger, and accessories including a first clamp mounted on the fixed finger, a first measuring standard associated with the fixed finger, a fixed leg having a first measuring face and a head securing the first measuring standard, a second clamp mounted on the moving finger, a second measuring standard associated with the moving finger, a moving leg having a second measuring face and a head securing the second measuring standard therein. The first measuring face is disposed to contact a first point of the body and, moving the slider, the second measuring face is disposed to contact a second point of the body, providing for measuring a length between the points, generally being greater than the caliper's length. The tool may additionally have intermediate measuring standards.

4 Claims, 3 Drawing Sheets

CALIPER AND ACCESSORIES THEREFOR

FIELD OF THE INVENTION

The present invention relates to the field of measuring dimensions and gaps of preferably solid bodies, particularly to accessories for calipers allowing for extensions of the measurement range of such calipers.

BACKGROUND OF THE INVENTION

There are known a caliper and accessories therefor disclosed in U.S. Pat. No. 5,345,692 issued to the instant inventor. According to one of the design options of that patent, the caliper has a fixed measuring surface and a moving measuring surface, the caliper is furnished with at least one measuring standard slidably disposed in a mounting means associated either with the fixed measuring surface or with the moving measuring surface opposite to the fixed measuring surface, wherein the mounting means accommodates a first face of the measuring standard while a second (opposite) face of the measuring standard can be placed against the opposite measuring surface so as to create a measuring gap between the second surface of the measuring standard and the opposite measuring surface of the caliper, so that the measuring gap can be selected in both size and position at the measuring location without further adjustment.

While the aforementioned device provides for convenient measurements of certain bodies, its measurement range is limited and particularly cannot exceed the caliper's length.

BRIEF SUMMARY AND OBJECT OF THE INVENTION

It is therefore desirable to provide accessories that permit the caliper to measure dimensions and gaps of a body, which dimensions and gaps having a length exceeding the caliper's length.

This invention is proposed at least for achieving the aforementioned object. In one preferred embodiment, the invention is represented by a tool for measurement of a body, wherein the tool includes a caliper and accessories associated therewith. The body has a first point and a second point and a length therebetween, and the measurement is provided for measuring the length. The caliper comprises: a frame; a fixed finger coupled with the frame; a slider embracing and being in sliding relationship with the frame, and capable of being operatively fixed on the frame in a required position; a moving finger coupled with the slider, wherein a maximal distance between the fixed finger and the moving finger is less than said length between the first point and the second point of the body; and a meter associated with the slider and capable of visual indication of the distance between the fixed finger and the moving finger. The accessories comprise: a first clamp releasably mounted on the fixed finger; a first measuring standard mounted in a face-to-face relationship with the fixed finger, wherein the first measuring standard has a proximal end secured in the first clamp, a distal end and a first standard length; a fixed leg having a first measuring face and a first head receiving the distal end of the first measuring standard thereby securing the first measuring standard therein; a second clamp releasably mounted on the moving finger; a second measuring standard having a proximal end secured in the second clamp and mounted in a face-to-face relationship with the moving finger a distal end and a second standard length; a moving leg having a second measuring face and a second head receiving the distal end of the second measuring standard and securing the second measuring standard therein. In other embodiments, the user may enter the aforementioned lengths into the meter (e.g. if it's a digital device capable of calculating the total length), so that the meter will indicate the total length between the first point and the second point.

The user positions the first measuring face such that it has a face-to-face relationship with the first point of the body and, by moving the slider, the user positions the second measuring face such that it has a face-to-face relationship with the second point of the body. This causes the meter to visually indicate the distance. The length between the first point and the second point of the body is obtained by adding the first standard length and the second standard length to the measured distance. If the user needs to measure a length of a gap between the first point and the second point of the body, then a width of the fixed leg and a width of the moving leg should be added to the sum of the measured distance, the first standard length, and the second standard length in order to produce the length of the gap between the first point and the second point of the body. In other embodiments, the user may enter the aforementioned lengths into the meter (e.g. if it's a digital device capable of calculating the total length, so that the meter will indicate the total length between the first point and the second point.

According to another preferred embodiment of the invention, having the above described caliper, the accessories comprise: a first clamp releasably mounted on the fixed finger; a first measuring standard mounted in a face-to-face relationship with the fixed finger, wherein the first measuring standard has a proximal end secured in the first clamp, a distal end and a first standard length; a fixed leg having a first measuring face and a first head receiving the distal end of the first measuring standard thereby securing the first measuring standard therein; a second clamp releasably mounted on the moving finger; a second measuring standard having a proximal end secured in the second clamp and mounted in a face-to-face relationship with the moving finger, a distal end and a second standard length; at least one intermediate measuring standard having a proximal end joined in a face-to-face relationship with the distal end of the second measuring standard, and an intermediate standard length; a moving leg having a second measuring face and a second head receiving the distal end of the at least one intermediate measuring standard and securing the at least one intermediate measuring standard therein.

The user positions the first measuring face such that it has a face-to-face relationship with the first point of the body, and, by moving the slider, the user positions the second measuring face such that it has a face-to-face relationship with the second point of the body. This causes the meter to visually indicate the distance. The length between the first point and the second point of the body is obtained by adding the first standard length, the second standard length, and the intermediate standard length to the measured distance.

In optional embodiments, the first measuring standard can be joined with at least on intermediate measuring standard, while the second measuring standard is directly joined with the second clamp; or the distal ends of both the first and second measuring standards can be joined each with at least one intermediate measuring standard, which in turn can be secured in the first and second heads respectively.

DESCRIPTION OF DRAWINGS OF THE INVENTION

DESCRIPTION OF PREFERRED EMBODIMENTS OF THE INVENTION

Figure 1:
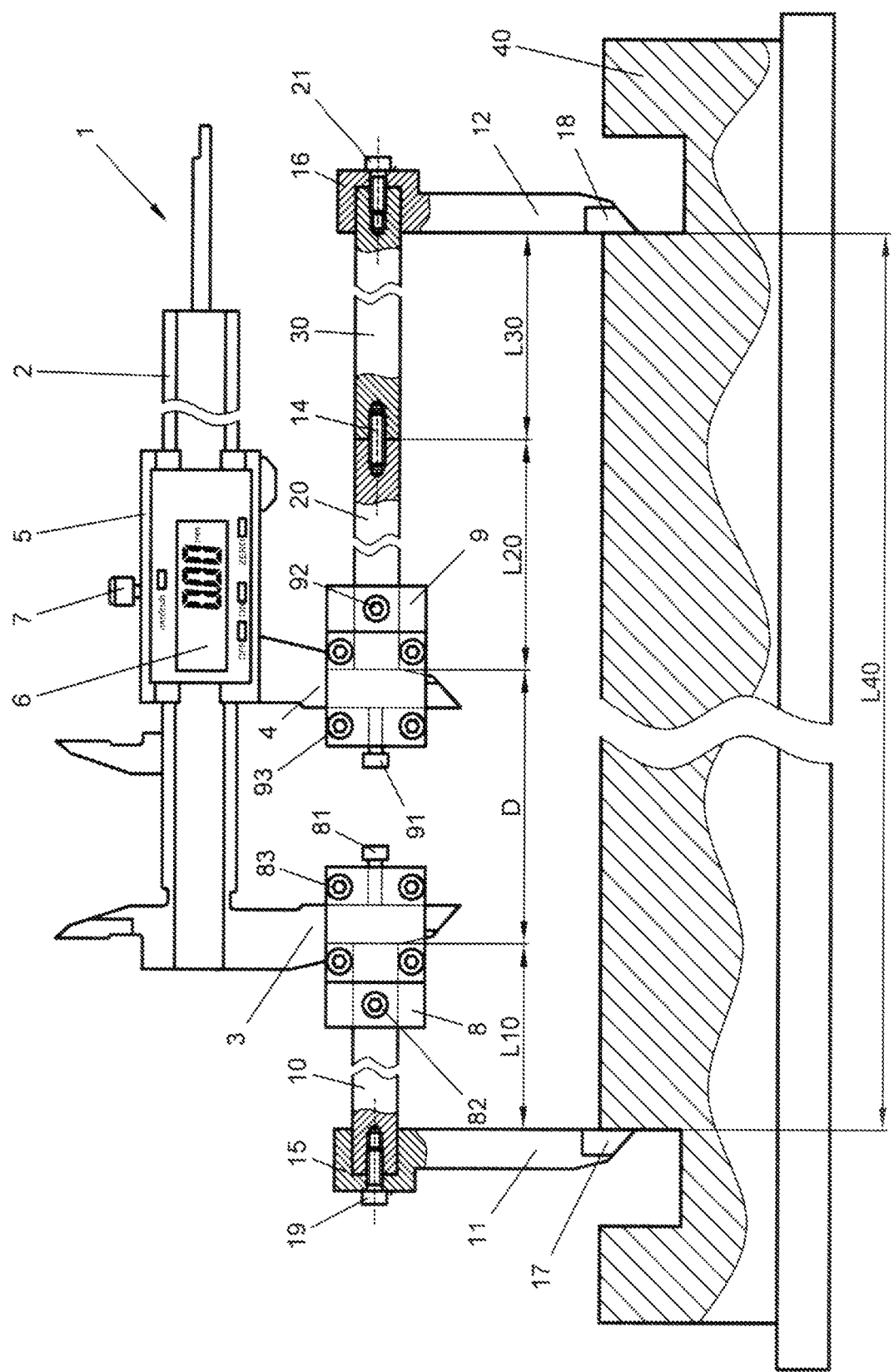
FIG. 1 is a side elevation view of a sliding caliper with the inventive accessories measuring an external length of a measured body.

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

Figure 2:
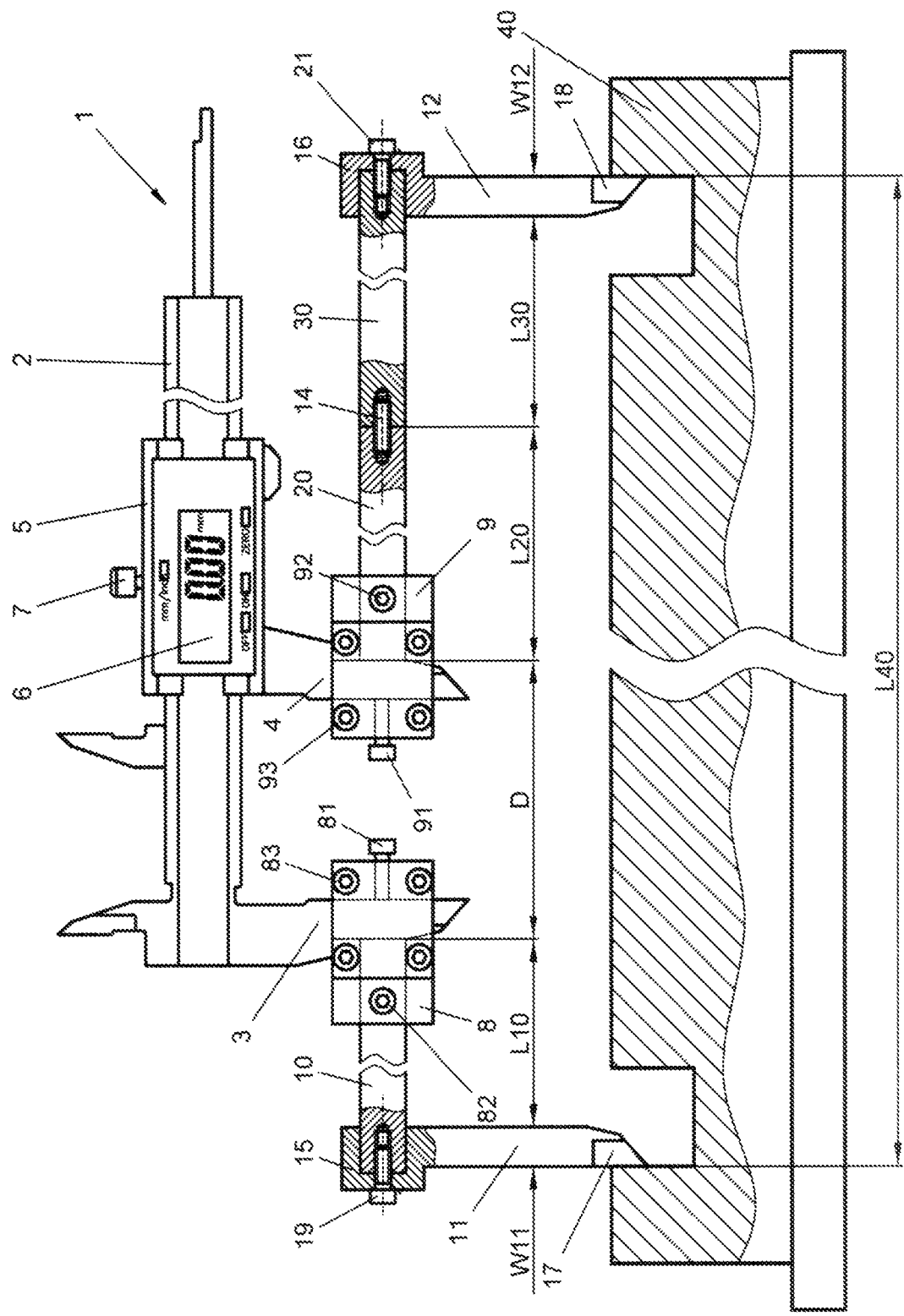
FIG. 2 is a side elevation view of a sliding caliper with the inventive accessories measuring an internal gap of a measured body.

According to one preferred embodiment of the invention, a caliper 1 (illustrated on FIGS. 1 and 2) comprises: a frame 2; a fixed finger 3 carried by the frame 2; a slider 5 embracing and being in sliding relationship with the frame 2, wherein the slider 5 can be fixed on the frame 2 in a required position by a thumb screw or a wing screw 7; a moving finger 4 coupled with the slider 5, wherein a maximal distance between the fixed finger 3 and the moving finger 4 is less than the length 40 between a first point and a second point of a body to be measured; and a meter 6 calibrated in sufficiently small increments providing a sufficient precision for measuring the body (preferably a solid body) to be measured. The meter 6 can be represented by a suitable analog, digital or another type of device capable of indicating a distance D measured between the outer faces of the fingers 3 and 4, as shown in FIGS. 1 and 2.

According to the aforementioned preferred embodiment of the invention, the caliper 1 is associated with accessories (FIGS. 1, 2 and 3) comprising:

a first clamp 8 releasably mounted on the fixed finger 3;
a first measuring standard 10 mounted in a face-to-face relationship with the fixed finger 3 as described below, wherein the first measuring standard 10 having: a proximal end secured by a thumb screw 82 in the first clamp 8, a distal end, and a blind threaded hole provided at the distal end of the first measuring standard 10; a second clamp 9 releasably mounted on the moving finger 4;

a second measuring standard 20 mounted in a face-to-face relationship with the moving finger 4 as described below, wherein the second measuring standard 20 having: a proximal end secured by a thumb screw 92 in the second clamp 9, a distal end, and a blind threaded hole provided at the distal end of the second measuring standard 20;

an third (intermediate) measuring standard 30 mounted in a face-to-face relationship with the second measuring standard 20, wherein the third measuring standard 30 having: a proximal end with a proximal blind threaded hole and a distal end with a distal threaded blind hole, wherein the third measuring standard 30 is coupled with the second measuring standard 20 by a connecting screw 14 furnished with a first outer thread and a second outer thread, such that the first outer thread is received by a distal blind hole 201 (shown in FIG. 3) of the second measuring standard 20 and the second outer thread is received by a proximal blind hole 301 (shown in FIG. 3) of the third measuring standard 30;

a fixed leg 11 having a measuring face 17 and a head 15 receiving the distal end of the first measuring standard 10, wherein a blind threaded hole 102 (shown in FIG. 3) of the distal end of the first measuring standard 10 receives a screw 19 securing the distal end of the first measuring standard 10 in the head 15; a moving leg 12 having a measuring face 18 (facing the measuring face 17 as shown on FIG. 1, or alternatively facing in the direction opposite to the measuring face 17 as shown on FIG. 2), and a head 16 receiving the distal end of the third measuring standard 30, wherein a distal blind threaded hole 302 (shown in FIG. 3) of the third measuring standard 30 receives a screw 21 securing the distal end of the third measuring standard 30 in the head 16.

Figure 3:
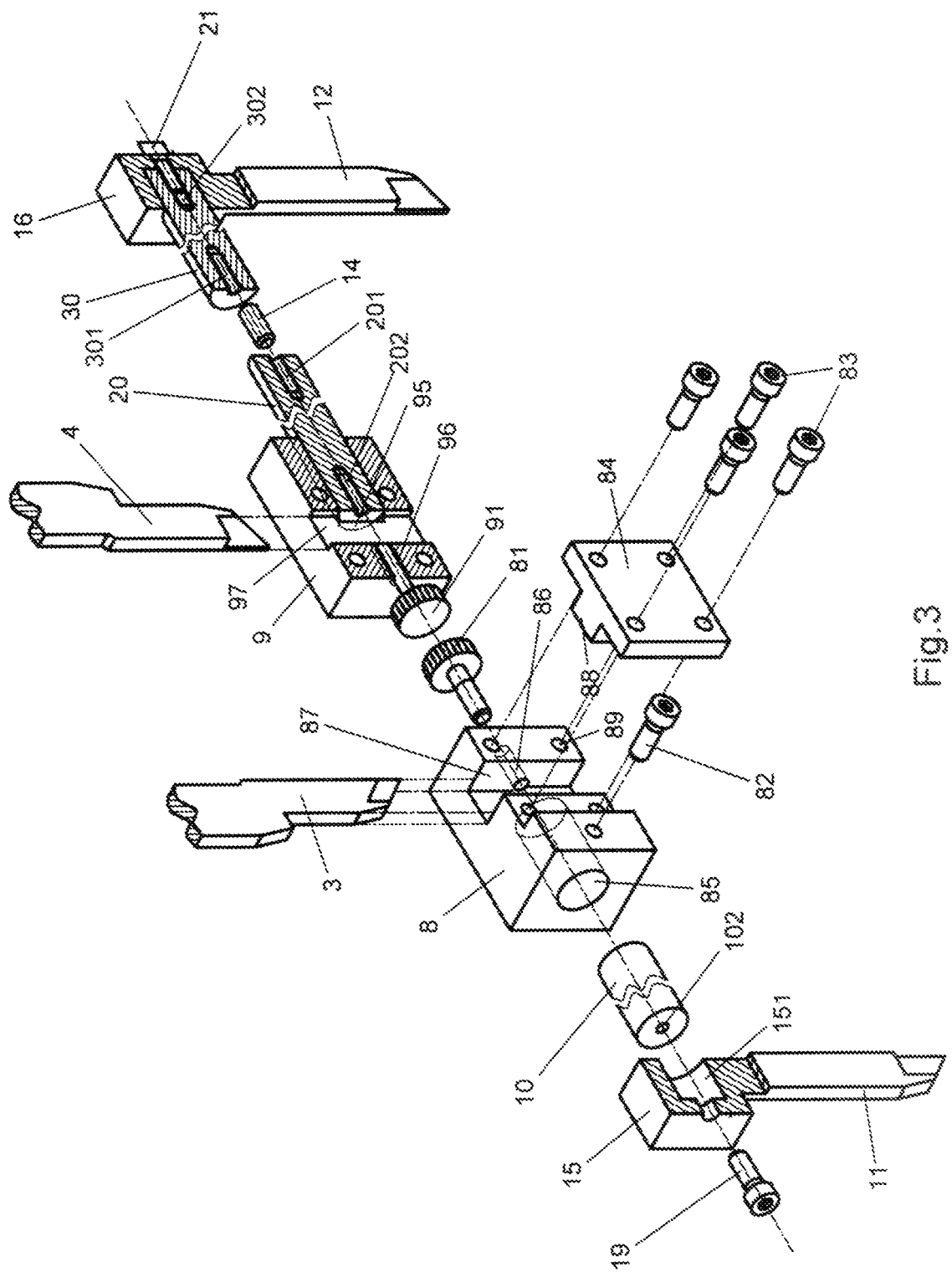
FIG. 3 is an isometric exploded view of portions of the inventive accessories depicted on FIGS. 1 and 2.

FIG. 3 shows a number of elements used for assembling the caliper 1 with the inventive accessories thereof. The first clamp 8 and the second clamp 9 have a groove 87 and a groove 97 respectively, wherein the grooves 87 and 97 receive the fixed finger 3 and the moving finger 4 respectively. The first clamp 8 has a number of blind threaded holes 89, and is covered by a plate 84 having the corresponding number of through holes and a ledge 88 received by the groove 87. The through holes receive the corresponding number of screws 83 matching the blind threaded holes 89. The screws 83 are screwed into the blind threaded holes 89, but providing a space for inserting the fixed finger 3. Similar screws, holes and plate (not shown) are used for the second clamp 9 providing for inserting the moving finger 4 therein.

As shown in FIG. 3, the first clamp 8 is provided with a threaded hole 86 receiving a thumb screw 81 (that can also be, for example, a wing screw or the like). The thumb screw 81 is used for fixation of the fixed finger 3 in the groove 87. The first clamp 8 is also provided with a through hole 85 receiving a proximal end of the first measuring standard 10 that is fixed therein by the thumb screw 82.

Similarly, the second clamp 9 is provided with a threaded hole 96 receiving a thumb screw 91. The thumb screw 91 is used for fixation of the moving finger 4 in the groove 97. The second clamp 9 is also provided with a through hole 95 receiving a proximal end of the second measuring standard 20 that is fixed therein by the thumb screw 92 (shown in FIGS. 1 and 2).

The second measuring standard 20 has a blind threaded hole 201 provided at the distal end of the second measuring standard 20. The blind threaded hole 201 receives a screw 14 for joining the third measuring standard 30. The second measuring standard 20 may optionally have a blind threaded hole 202 that allows making the measuring standards 10, 20 and 30 uniform. If a user needs to further extend the measuring length of the device (beyond the distance D plus the lengths L10, L20 and L30 of the corresponding measuring standards 10, 20 and 30), then the user can use a number of additional measuring standards that can also be made uniform, having blind threaded holes on both ends thereof. When the user does not need the intermediate measuring standard 30, then the second measuring standard 20 can be used for receiving the screw 21.

As shown in FIG. 3, the fixed leg 11 has a head 15 including a through hole 151 receiving a distal end of the first measuring standard 10. The first measuring standard 10 has a blind threaded hole 102 on the distal end thereof. The blind threaded hole 102 receives a screw 19 securing the first measuring standard 10 inside the through hole 151 of the head 15.

The measuring standards 10, 20 and 30 preferably have a cylindrical shape, but other shapes suitable for particular measurement purposes can also be utilized. In general, the proposed device can be equipped with a different number of measuring standards (e.g. four and more), which number should be suitable for measuring a body having a dimension that significantly exceeds the length of caliper 1.

In optional embodiments of the invention, the accessories may have only one pair of measuring standards (i.e. they don't have any intermediate measuring standards like the measuring standard 30), e.g. the measuring standard 10 may be coupled with a modified measuring standard 20 that is, in turn, coupled directly with the head 16 (FIG. 3). If necessary, a modified measuring standard 10 could be made similar to the measuring standard 20, i.e. coupled by a similar means (like the screw 14) with an intermediate measuring standard (like the measuring standard 30), which, in turn, would be coupled with the head 15. Other optional embodiments may have a number of intermediate measuring standards necessary for particular measurements.

OPERATION OF PREFERRED EMBODIMENTS OF THE INVENTION

As shown on FIG. 1, the measuring faces 17 and 18 embrace a measured body (preferably, a solid structure) 40, for example, measuring its length 40L. The measured length consists of a distance D (normally indicated by the meter 6) between the measuring faces of the fixed finger 8 and the moving finger 9 plus lengths of L10, L20 and L30 of the measuring standards 10, 20 and 30 respectively. All these lengths can be provided for the user (for example in a table included in the instruction for using the device), or can be directly marked on the measuring standards, or can be pre-accounted when calibrating the meter 6 in some specific cases of measurements, so that the meter 6 shows a sum of the distance D between the measuring faces of the fixed finger 8 and the moving finger 9 plus the lengths of L10, L20 and L30. As mentioned above, in some embodiments, the user may enter the aforementioned lengths into the meter 6 (e.g. if it's a digital device capable of calculating the total length), so that the meter 6 will indicate the total length between the first point and the second point of the body.

As shown on FIG. 2, the measuring faces 17 and 18 are positioned to measure a gap L40 in the measured body (solid structure) 40. The measured gap L40 consists of a distance D (normally indicated by the meter 6) between the measuring faces of the fixed finger 8 and the moving finger 9 plus the lengths L10, L20 and L30 of the measuring standards 10, 20 and 30 respectively plus widths of the fixed leg 11 and moving leg 12, correspondingly W11 and W12.

All these lengths can be provided for the user (for example in a table included in the instruction for using the device), or can be directly marked on the measuring standards, or can be pre-accounted when calibrating the meter 6 in some specific cases of measurements, so that the meter shows a sum of the distance D between the fixed finger 8 and the moving finger 9 plus the lengths of L10, L20 and L30, plus the widths of W11 and W12.

We claim:

1. A tool for measurement of a body, said tool including a caliper and accessories associated therewith, wherein:
    said body has a first point, a second point, and a length therebetween, and the measurement is provided for measuring the length;
    said caliper comprises: a frame; a fixed finger coupled with the frame; a slider embracing and being in sliding relationship with the frame and capable of being operatively fixed on the frame in a required position; a moving finger coupled with the slider, wherein a maximal distance between the fixed finger and the moving finger is less than said length between the first point and the second point; and a meter associated with the slider and capable of visual indication of a distance between the fixed finger and the moving finger;
    said accessories comprise:
        a first clamp mounted on the fixed finger;
        a first measuring standard mounted in a face-to-face relationship with the fixed finger, wherein the first measuring standard has a proximal end secured in the first clamp, a distal end and a first standard length;
        a fixed leg having a first measuring face and a first head receiving the distal end of the first measuring standard thereby securing the first measuring standard therein;
        a second clamp mounted on the moving finger;
        a second measuring standard mounted in a face-to-face relationship with the moving finger, wherein the second measuring standard has a proximal end secured in the second clamp, a distal end and a second standard length;
        a moving leg having a second measuring face and a second head receiving the distal end of the second measuring standard and securing the second measuring standard therein; and
    wherein: the first measuring face is positioned such that having a face-to-face relationship with said first point of the body and, by moving the slider, the second measuring face is positioned such that having a face-to-face relationship with said second point of the body, thereby causing the meter to visually indicate said distance between the fixed finger and the moving finger, wherein said distance, being summed with the first standard length and the second standard length, produces said length between the first point and the second point of the body.

2. A tool for measurement of a body, said tool including a caliper and accessories associated therewith, wherein:
    said body has a gap defining a first point, a second point, and a gap length therebetween, and the measurement is provided for measuring the gap length;
    said caliper comprises: a frame; a fixed finger coupled with the frame; a slider embracing and being in sliding relationship with the frame, and capable of being operatively fixed on the frame in a required position; a moving finger coupled with the slider, wherein a maximal distance between the fixed finger and the moving finger is less than said length between the first point and the second point; and a meter associated with the slider and capable of visual indication of a distance between the fixed finger and the moving finger;
    said accessories comprise:
        a first clamp mounted on the fixed finger;
        a first measuring standard mounted in a face-to-face relationship with the fixed finger, wherein the first measuring standard has a proximal end secured in the first clamp, a distal end, and a first standard length;
        a fixed leg having a first measuring face and a first head receiving the distal end of the first measuring standard thereby securing the first measuring standard therein; the fixed leg defines a first width thereof;
        a second clamp mounted on the moving finger;
        a second measuring standard mounted in a face-to-face relationship with the moving finger, wherein the second measuring standard has a proximal end secured in the second clamp, a distal end, and a second standard length;

a moving leg having a second measuring face and a second head receiving the distal end of the second measuring standard and securing the second measuring standard therein; the moving leg defines a second width thereof; and wherein:

the first measuring face is positioned such that having a face-to-face relationship with said first point of the body and, by moving the slider, the second measuring face is positioned such that having a face-to-face relationship with said second point of the body, thereby causing the meter to visually indicate said distance between the fixed finger and the moving finger, wherein said distance, being summed with the first standard length, the first width, the second standard length, and the second width, produces said gap length between the first point and the second point of the body.

3. A tool for measurement of a body, said tool including a caliper and accessories associated therewith, wherein:

said body has a first point and a second point and a length therebetween, and the measurement is provided for measuring said length;

said caliper comprises: a frame; a fixed finger coupled with the frame; a slider embracing and being in sliding relationship with the frame, and capable of being operatively fixed on the frame in a required position; a moving finger coupled with the slider, wherein a maximal distance between the fixed finger and the moving finger is less than said length between the first point and the second point; and a meter associated with the slider and capable of visual indication of a distance between the fixed finger and the moving finger;

said accessories comprise:

a first clamp mounted on the fixed finger;

a first measuring standard mounted in a face-to-face relationship with the fixed finger, wherein the first measuring standard has a proximal end secured in the first clamp, a distal end, and a first standard length;

a fixed leg having a first measuring face and a first head receiving the distal end of the first measuring standard thereby securing the first measuring standard therein;

a second clamp releasably mounted on the moving finger;

a second measuring standard having a proximal end mounted in a face-to-face relationship with the moving finger and secured in the second clamp, a distal end, and a second standard length;

at least one intermediate measuring standard having a proximal end joined in a face-to-face relationship with the distal end of the second measuring standard, a distal end, and an intermediate standard length;

a moving leg having a second measuring face and a second head receiving the distal end of the at least one intermediate measuring standard and securing the at least one intermediate measuring standard therein; and wherein:

the first measuring face is positioned such that having a face-to-face relationship with said first point of the body and, by moving the slider, the second measuring face is positioned such that having a face-to-face relationship with said second point of the body, thereby causing the meter to visually indicate said distance between the fixed finger and the moving finger, wherein said distance, being summed with the first standard length, the second standard length, and the intermediate standard length, essentially produces said length between the first point and the second point of the body.

4. The tool according to claim 3, wherein:

said second measuring standard has a threaded blind hole provided at the distal end thereof;

said at least one intermediate measuring standard has a threaded blind hole provided at the proximal end thereof; and said accessories further comprise a connecting screw furnished with a first outer thread and a second outer thread, such that the first outer thread is received by the threaded blind hole of the second measuring standard and the second outer thread is received by the threaded blind hole of the at least one intermediate measuring standard, thereby joining the second measuring standard and the intermediate measuring standard.

\* \* \* \* \*